US012704089B2

(12) United States Patent
Fang

(10) Patent No.: US 12,704,089 B2
(45) Date of Patent: Aug. 11, 2026

(54) DOUBLE CRANKSHAFT RECIPROCATING ENGINE

(71) Applicant: Shufeng Fang, Tianjin (CN)

(72) Inventor: Shufeng Fang, Tianjin (CN)

( * ) Notice: Subject to any disclaimer, the term of this patent is extended or adjusted under 35 U.S.C. 154(b) by 0 days.

(21) Appl. No.: 19/008,429

(22) Filed: Jan. 2, 2025

(65) Prior Publication Data

US 2026/0043345 A1 Feb. 12, 2026

Related U.S. Application Data

(63) Continuation of application No. PCT/CN2024/132194, filed on Nov. 15, 2024.

(30) Foreign Application Priority Data

Aug. 7, 2024 (CN) ........................ 202411082796.X

(51) Int. Cl.
*F02B 75/32* (2006.01)
*F02B 75/28* (2006.01)

(52) U.S. Cl.
CPC ............ *F02B 75/32* (2013.01); *F02B 75/287* (2013.01)

(58) Field of Classification Search
CPC ............................... F02B 75/32; F02B 75/287
See application file for complete search history.

(56) References Cited

U.S. PATENT DOCUMENTS

| | | | | | |
|---|---|---|---|---|---|
| 1,433,649 | A | * | 10/1922 | Powell | F02B 25/00 123/47 R |
| 3,220,177 | A | * | 11/1965 | Kohler | F02G 1/044 60/526 |
| 5,050,570 | A | * | 9/1991 | Thring | F02G 1/043 123/556 |
| 5,644,917 | A | * | 7/1997 | McWaters | F01B 9/042 60/519 |

(Continued)

FOREIGN PATENT DOCUMENTS

| | | |
|---|---|---|
| CN | 101845988 A | 9/2010 |
| CN | 201687595 U | 12/2010 |

(Continued)

OTHER PUBLICATIONS

International Search Report issued in PCT/CN2024/132194, mailed Apr. 19, 2025, with English translation.

*Primary Examiner* — Kevin A Lathers
(74) *Attorney, Agent, or Firm* — HSML P.C.

(57) ABSTRACT

The present invention discloses a double crankshaft reciprocating engine comprising a cylinder assembly and a double crankshaft transmission system. The cylinder assembly comprises a cylinder, a piston and a displacer. An intake valve is provided at the top of the cylinder. The piston is mounted in the cylinder and forms a combustion chamber with an inner wall of the cylinder located above the piston; the displacer is mounted below the piston, and a space between the displacer and the piston is a compression chamber. The piston is provided with first vent holes and a (Continued)

first exhaust valve. The displacer is provided with second vent holes and a second exhaust valve. The double crankshaft transmission system comprises a double crankshaft and a plurality of rhombic drive mechanisms, and the rhombic drive mechanisms are connected to the displacer and the piston through a displacer rod and a piston rod, respectively.

8 Claims, 5 Drawing Sheets

(56) References Cited

U.S. PATENT DOCUMENTS

2012/0227708 A1* 9/2012 Jones .................... F02B 75/24
123/47 A

FOREIGN PATENT DOCUMENTS

| | | | |
|---|---|---|---|
| CN | 103470352 | A | 12/2013 |
| CN | 106555670 | A | 4/2017 |
| CN | 111946456 | A | 11/2020 |
| TW | 200506186 | A | 2/2005 |

* cited by examiner

DOUBLE CRANKSHAFT RECIPROCATING ENGINE

TECHNICAL FIELD

The present invention relates to the technical field of fuel engines, particularly to a double crankshaft reciprocating engine.

BACKGROUND TECHNOLOGY

A reciprocating crude oil engine works as follows:

The piston crude oil engine consists of a working cylinder, a working piston, as well as the so-called five systems and two major mechanisms, namely, a lubrication system, a cooling water circulation system, an injection system, a starting system, a crankshaft push rod mechanism and a valve train.

Crude oil engines operate in four stages: intake, compression, work and exhaust, known as four strokes. After intake of the cylinder, the fuel system injects fuel to form a mixture of combustible gases, the starter motor and flywheel inertia force drives the crankshaft push rod mechanism and piston to compress the combustible gases, generating high temperature and high pressure, thereby enabling the combustible gas sprayed into the atomized fuel to combust and expand, the pressure directly acts on the piston, pushing the piston along the cylinder to reciprocate linearly in high speed, and then the linear motion of the piston will be converted into the rotary motion of the crank through the crank push rod mechanism, so as to output mechanical power.

Intake stroke: The crankshaft drives the piston from TDC (top dead center) to BDC (bottom dead center), at the same time the intake valve opens and the exhaust valve closes. As the piston moves downward, the volume in the cylinder gradually increases, forming a negative pressure state □ so that the outside air can be drawn into the cylinder.

Compression stroke: the piston is driven by the crankshaft to move from BDC to TDC, at the same time the intake and exhaust valves are closed. During the piston moving upward, the volume of the gas in the cylinder gradually decreases and the gas is compressed, resulting in a sharp rise in pressure and temperature in the cylinder.

Power stroke: When the temperature and pressure in the cylinder reach a peak, much higher than the burning point of crude oil, the injector nozzle injects fuel into the cylinder. In the high temperature and pressure environment, the fuel and air quickly mix and spontaneously combust, pushing the piston to move downward, thus driving the crankshaft to rotate through the push rod, realizing the output of power.

Exhaust stroke: The exhaust valve opens and the piston moves from BDC to TDC through the driving of the crankshaft. As the piston moves upwardly, the exhaust gases in the cylinder are discharged, ready for the next operating cycle.

There exists problems:

However, the slow combustion rate of crude oil limits the minimum time per cycle, which in turn limits the maximum speed of the crude oil engine. There are few operating conditions in which crude oil fuel can be fully combusted, and it cannot be efficiently adapted to a variety of complex operating conditions.

Rhombic Drive Mechanism:

The Rhombic drive mechanism was invented by Dr. R J Meijer of the Philips Company and its structure is shown in FIG. 2. Two identical connecting rods are connected to a pair of symmetrical cranks at one end, and two identical push rods are connected to this pair of symmetrical cranks at one end □ the other ends of the two connecting rods are connected to both ends of the bottom cross beam of the piston rod; the other ends of the two push rods are connected to both ends of the bottom cross beam of the displacer rod. So they form a hexagonal transmission mechanism symmetrical on both sides. The piston rod passes through the tubular displacer rod and the center hole of the displacer, and is connected to the piston. Two identical gears are connected to the center shaft of the crank and mesh with each other to constrain the two cranks to rotate synchronously in opposite directions, which in turn constrains the motion trajectory of the hexagonal transmission mechanism and ensures that the piston rod and the displacer rod reciprocate linearly in the vertical direction.

SUMMARY OF THE INVENTION

It is an object of the present invention to provide a double crankshaft reciprocating engine to improve the combustion conditions of existing crude oil engines, to increase engine power and thermal efficiency, and to reduce engine noise and vibration.

To solve the above technical problems, embodiments of the present invention provide a double crankshaft reciprocating engine, comprising:

- a plurality of cylinder assemblies, comprising:
  - a cylinder, which is provided with cylinder air inlets and an intake valve at the top;
  - a piston, which is mounted in the cylinder, the piston and an inner wall of the cylinder located above the piston form a combustion chamber; the piston is provided with first vent holes and a first exhaust valve for controlling the on-off of the first vent holes; and
  - a displacer, which is mounted in the cylinder and located below the piston, the cylindrical space between the displacer and the piston is a compression chamber; the displacer is provided with second vent holes and a second exhaust valve for controlling the on-off of the second vent holes; and
- a double crankshaft drive system, comprising:
  - two crankshafts provided in parallel, each crankshaft comprises a plurality of cranks, a plurality of the corresponding cranks of the two crankshafts constitute a plurality of crank pairs and each of the crank pairs is mirror symmetric with respect to a YZ plane; and
  - a plurality of rhombic drive mechanisms, which are connected to the two crankshafts by means of the crank pairs; wherein each rhombic drive mechanism is connected to the piston and the displacer of one of the cylinder assemblies; a pair of transmission gears of the rhombic drive mechanism are mounted on the front ends of the two crankshafts and mesh with each other;
  - wherein a midpoint of a connecting line of centers of the pair of transmission gears is defined as the origin O of an XYZ coordinate system, the connecting line of centers is defined as the X-axis direction, a direction parallel to the axis of the transmission gears is defined as the Y-axis direction, and a vertical direction is defined as the Z-axis direction.

In an embodiment, the rhombic drive mechanism comprises:

a displacer rod, which is a hollow rod extending in the Z-axis direction and connected to the displacer at a top end and extending out of a bottom end of the cylinder at a bottom end;

a piston rod, which extends in the Z-axis direction and has a top end connected to the piston and a bottom end passing through the displacer and the displacer rod and extending beyond the bottom end of the displacer rod;

two push rods, upper ends of the two push rods are rotatably connected to the bottom end of the displacer rod respectively; and two connecting rods, lower ends of the two connecting rods are rotatably connected to the bottom ends of the piston rods respectively, and the lower ends of the two push rods and the upper ends of the two connecting rods are rotatably connected to the same crank pair respectively.

Specifically, the bottom ends of the displacer rod and the piston rod are in an inverted "T" shape, and respectively have a cross beam extending in the X-axis direction, the cross beam is provided with a first shaft hole at each end, the connecting rods and the push rods are provided with a second shaft hole at each end respectively, and the piston rod and the displacer rod are pivotally connected to the connecting rods and the push rods by means of pins which link the first shaft hole and the second shaft hole.

Each of the cranks is provided with a crank pin, the connecting rods and the push rods are pivotally connected to the crank pair by means of the second shaft hole cooperating with the crank pin.

In an embodiment, the first exhaust valve is rotatably mounted in the piston and provided with first exhaust valve holes; the first exhaust valve is connected to an exhaust valve control drive mechanism mounted on the piston to realize the opening and closing of the first exhaust valve by means of rotating the first exhaust valve; wherein when the first exhaust valve is closed, the first vent holes and the first exhaust valve holes are offset and not communicated; when the first exhaust valve is open, the first vent holes are aligned and communicated with the first exhaust holes; the structural form and working principle of the second exhaust valve are the same as those of the first exhaust valve.

In one embodiment, the exhaust valve drive mechanism comprises an exhaust valve rack, an exhaust valve gear, and a pneumatic device; wherein the exhaust valve gear and the first exhaust valve are coaxially and rotatably mounted in the piston; the exhaust valve gear engages with the exhaust valve gear at one end and is fixedly connected to the pneumatic device at the other end, and the pneumatic device is actuated by a high-pressure gas in the compression chamber.

In one embodiment, the intake valve is rotatably mounted in the cylinder air inlets and provided with intake valve holes; the intake valve is connected to an intake valve drive mechanism mounted outside the top of the cylinder to realize the opening and closing of the intake valve by rotating the intake valve; wherein when the intake valve is closed, the cylinder air inlets and the intake valve holes are offset and not communicated, and when the intake valve is open, the cylinder air inlets are aligned and communicated with the intake valve holes.

In one embodiment, the intake valve drive mechanism comprises an intake valve rack, an intake valve gear and a hydraulic unit; wherein the intake valve gear and the intake valve are coaxially and rotatably mounted in the cylinder air inlets; and wherein the intake valve rack engages with the intake valve gear at one end and is fixedly connected with the hydraulic unit at the other end.

In an embodiment, the hydraulic unit of the intake valve drive mechanism may be replaced by an electrical motor.

The beneficial effects of the present invention are as following:

a. Due to the symmetry of the double crankshaft, the lateral inertia forces are canceled, and the double crankshaft shares half of the power of the piston and the displacer. Therefore, the design of the crankshaft is greatly simplified and the use of counterweight blocks is reduced. The double crankshaft disperses the force on the crankcase and reduces the strength requirements of the crankshaft and crankcase.

b. Due to having one compression chamber, the impact of the engine is greatly reduced, and the vibration and noise of the engine are reduced. The energy storage or work done in the compression chamber makes the working cycle of the engine more even and smooth.

c. Since the compression chamber can be used as a gas energy storage and part of the incomplete combustion conditions continue to be compressed and warmed up to combust and expand, the working conditions adapted to the reciprocating engine are greatly broadened, improving the maximum power.

REFERENCE SYMBOLS

Figure 1:
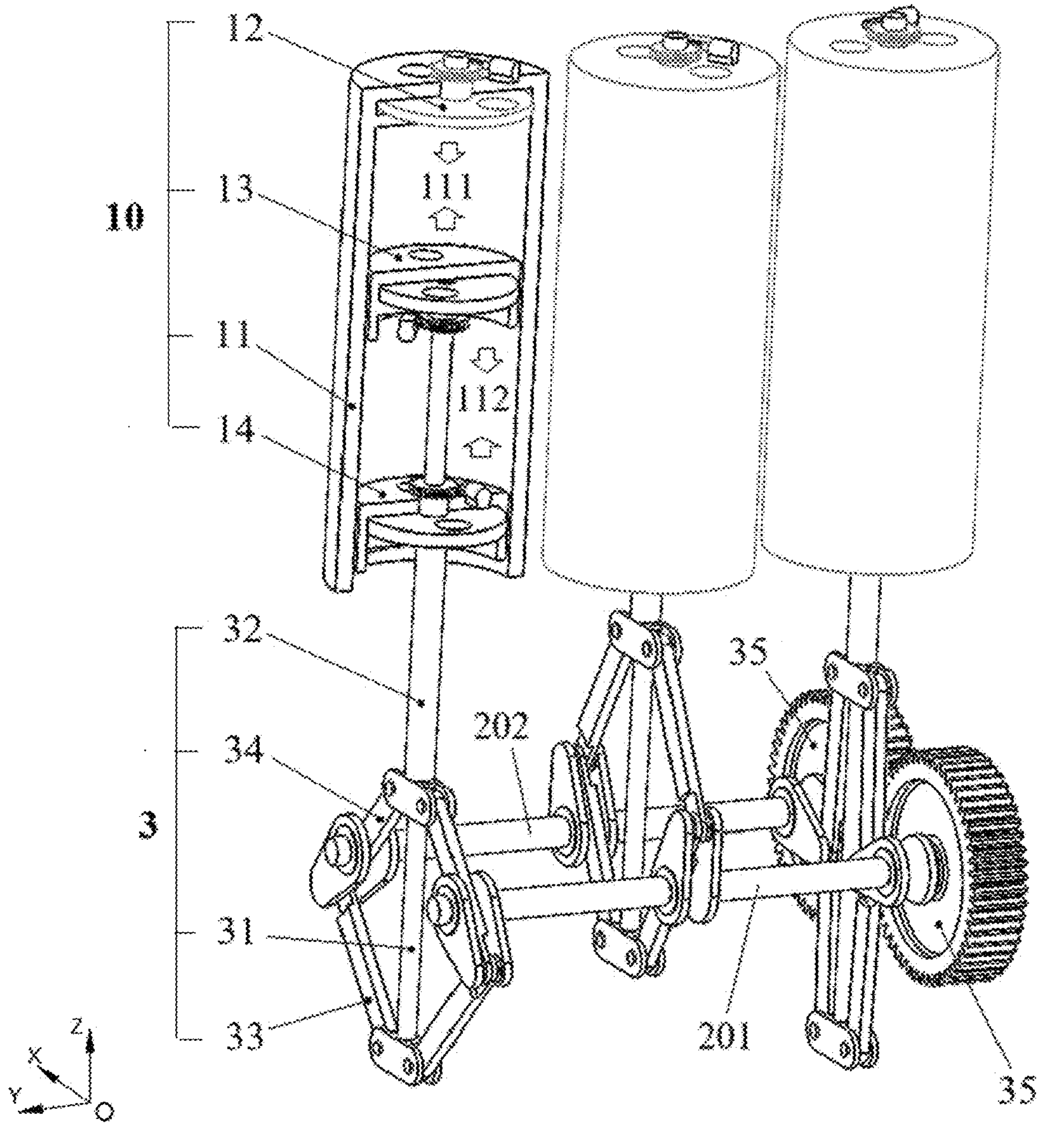
FIG. 1 is a perspective view of a double crankshaft reciprocating engine of an embodiment of the present invention.

10. cylinder assembly; 11. cylinder; 111. combustion chamber; 112. compression chamber; 12. intake valve; 13. piston; 14. displacer;

121. cylinder air inlet; 123. intake valve hole; 131. piston body; 132. first exhaust valve; 133. first exhaust valve hole; 135. first vent hole; 136. valve slot;

141. displacer body; 142. second exhaust valve; 143. second exhaust valve hole; 145. second vent hole; 146. valve slot;

20. double crankshaft transmission system; 201. first crankshaft; 202. second crankshaft;

3. rhombic drive mechanism; 31. piston rod; 311. first cross beam; 32. displacer rod; 321. second cross beam; 33. connecting rod; 34. push rod; 35. transmission gear; 36. crank pair; 361. crank pin;

4. intake valve drive mechanism; 41. intake valve rack; 42. intake valve gear; 43. hydraulic unit; 431. actuator cylinder; 432. solenoid valve; 433. hydraulic pump; 434. pressure control valve; 435. hydraulic oil tank;

5. exhaust valve drive mechanism; 51. exhaust valve rack; 52. exhaust valve gear; 53. pneumatic device; 531. gas reservoir; 532. directional valve; 533. actuator cylinder; 534. check valve.

DETAILED DESCRIPTION OF PREFERRED EMBODIMENTS

Each embodiment of the present application will be described in detail hereinafter in conjunction with the accompanying drawings for a clearer understanding of the purposes, features and advantages of the present application. It should be understood that the embodiments shown in the accompanying drawings are not intended to be a limitation of the scope of the present application, but are merely intended to illustrate the substantive spirit of the technical solution of the present application.

In the following description, certain specific details are set forth for the purpose of illustrating various disclosed embodiments to provide a thorough understanding of various disclosed embodiments. However, those skilled in the related art will recognize that embodiments may be practiced without one or more of these specific details. In other cases, familiar devices, structures, and techniques associated with the present application may not be shown or described in detail so as to avoid unnecessarily confusing the description of the embodiments.

Unless the context requires otherwise, throughout the specification and the claims, the words "including" and variants thereof, such as "comprising" and "having", are to be understood as open-ended and inclusive meaning, i.e., should be interpreted as "including, but not limited to".

References to "one embodiment" or "an embodiment" throughout the specification indicate that a particular feature, structure, or characteristic described in conjunction with an embodiment is included in at least one embodiment. Therefore, the occurrence of "in one embodiment" or "in an embodiment" at various locations throughout the specification need not all refer to the same embodiment. In addition, particular features, structures or characteristics may be combined in any manner in one or more embodiments.

As used in the specification and in the appended claims, the singular forms "a" and "an" include plural referents, unless the context clearly provides otherwise. It should be noted that the term "or" is normally used in its inclusive sense of "or/and", unless the context clearly provides otherwise.

In the following description, in order to clearly show the structure and working method of this application, it will be described with the help of many directional words, but words such as "front", "back", "left", "right", "outside", "inside", "outward", "inward", "up", "down", and the like should be understood as convenient terms and not as limiting terms.

In addition, the terms "horizontal", "vertical", "overhanging" and other terms do not mean that the component is required to be absolutely horizontal or overhanging, but can be slightly tilted. If "horizontal" only refers to its direction being more horizontal compared to "vertical", it does not mean that the structure must be completely horizontal, but can be slightly tilted.

In the description of this application, it should also be noted that unless otherwise specified and limited, the terms "provide", "mount", "connect to each other", and "connect" should be broadly understood, for example, it may be fixedly connected, detachably connected, or integrally connected; it may be a mechanical connection or an electrical connection; it may be directly connected, or indirectly connected through an intermediate medium, or it may be an internal connection between two components. For those skilled in this art, they can understand the specific meanings of the above terms in this application based on specific circumstances.

The present invention provides a double crankshaft reciprocating engine to improve combustion conditions of the existing crude oil engine, increase power and thermal efficiency of the crude oil engine, and reduce noise and vibration of the engine.

Figure 2:
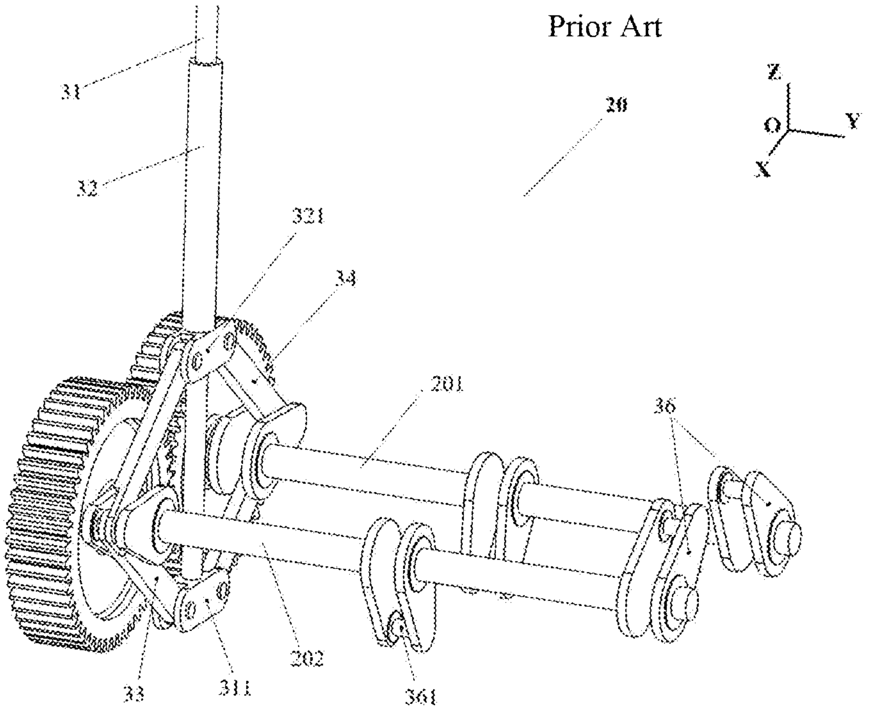
FIG. 2 is a schematic diagram of the structure of a double crankshaft transmission system.

As shown in FIGS. 1 and 2, a double crankshaft reciprocating engine comprises a plurality of cylinder assemblies 10 and a double crankshaft transmission system 20. wherein the cylinder assemblies 10 comprise a cylinder 11, an intake valve 12, a piston 13 and a displacer 14. The intake valve 12 is provided at the top of the cylinder 11 for controlling the entry of air into the cylinder 11. The intake valve 12 can be opened and closed by an electric motor or a hydraulic unit, and a specific switching and controlling mechanism, i.e., an intake valve drive mechanism 4 will be described below. Here one of the cylinder assemblies and the corresponding drive mechanism are used to illustrate the working principle and working process.

Figure 5:
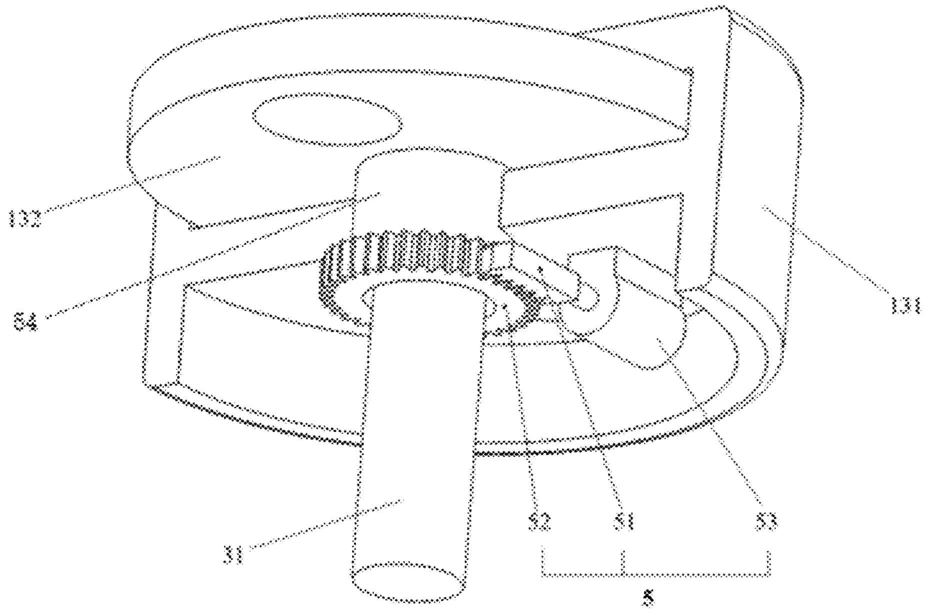
FIG. 5 is an illustrative diagram of the structure of a piston.
Figure 8:
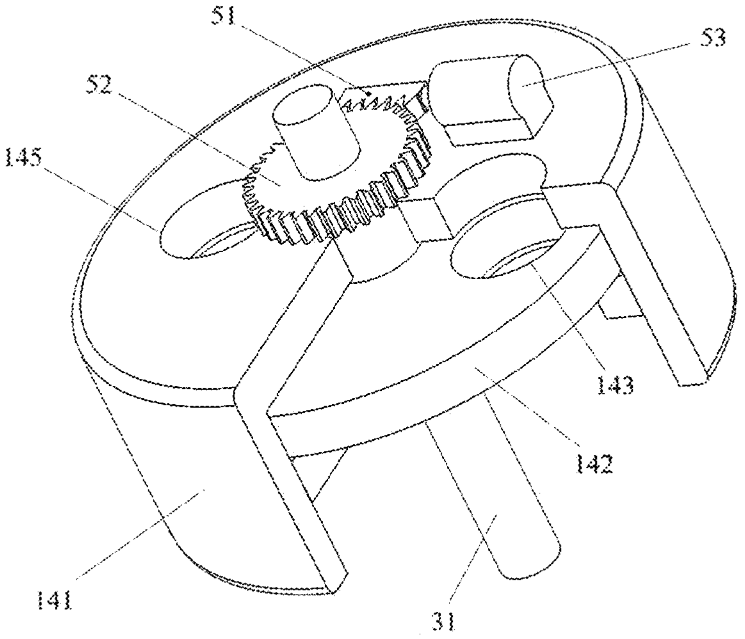
FIG. 8 is an illustrative diagram of the structure of a displacer.

The piston 13 and the displacer 14 are respectively mounted in the cylinder 11, wherein the piston 13 and the inner wall of the cylinder 11 located above the piston 13 form a closed space called as a combustion chamber 111, wherein the fuel is burned in the combustion chamber 111 to drive the piston 13 to make a linear reciprocating motion in the cylinder 11. A displacer 14 is located below the piston 13, and the cylindrical enclosed space between the displacer 14 and the piston 13 is called as a compression chamber 112. The piston 13 comprises a piston body 131 and a first exhaust valve 132, as shown in FIG. 5. The piston body 131 is a cylindrical structure. The piston 13 is provided with vent holes through the cylindrical piston body 131, i.e., first vent holes 135. The first exhaust valve 132 is mounted in the piston body 131 and allows gases in the combustion chamber 111 to be discharged into the lower cylinder chamber (compression chamber) of the piston 13. The displacer 14 also includes a cylindrical displacer body 141 and a second exhaust valve 142, as shown in FIG. 8. The displacer 14 is provided with vent holes through the cylindrical piston body, i.e., second vent holes 145. The second exhaust valve 142 is mounted in the displacer body 141 and allows gases in the compression chamber 112 to be expelled towards the underside of the displacer 14, discharging exhaust gases out of the cylinder. The second exhaust valve 142 allows outside air to be drawn in from outside the cylinder as the volume of the compression chamber 112 expands. Exhaust valve drive mechanisms 5 of the first exhaust valve 132 and the second exhaust valve 142 will be described below.

The double crankshaft transmission system 20 includes two crankshafts (i.e., a first crankshaft 201 and a second crankshaft 202), and a plurality of rhombic drive mechanisms 3. The rhombic drive mechanism 3 includes two identical transmission gears 35 mounted at the front ends of the two crankshafts and meshing with each other. For convenience of description, a midpoint of a connecting line of centers of the pair of transmission gears 35 is defined as the origin O of an XYZ coordinate system, the connecting line of centers is the X-axis direction, a direction parallel to the axis of the transmission gears 35 is the Y-axis direction, and a vertical direction is the Z-axis direction. Wherein, the two crankshafts 201, 202 are arranged in parallel, extending in the Y-axis direction, and since each crankshaft includes a plurality of cranks, the plurality of cranks of the two crankshafts constitutes a plurality of crank pairs 36 (shown in FIG. 2), and each crank pair 36 is mirror symmetric with respect to a YZ plane. The plurality of rhombic drive mechanisms 3 are connected to the two crankshafts via the plurality of crank pairs 36. Wherein each of the rhombic drive mechanisms is connected to the piston 13 and the displacer 14 of one of the cylinder assemblies.

In the embodiment shown in FIGS. 1, 2, the double crankshaft reciprocating engine includes three cylinder assemblies 10 arranged in a straight line along the Y-axis direction, each of the cylinder assemblies 10 is of the same structure, and the three cylinder assemblies 10 are connected respectively to three rhombic drive mechanism 3 of the double crankshaft transmission system 20 to output power. It should be understood that the number of cylinder assemblies 10 and rhombic drive mechanism 3 is not limited to the embodiment illustrated.

Figure 3:
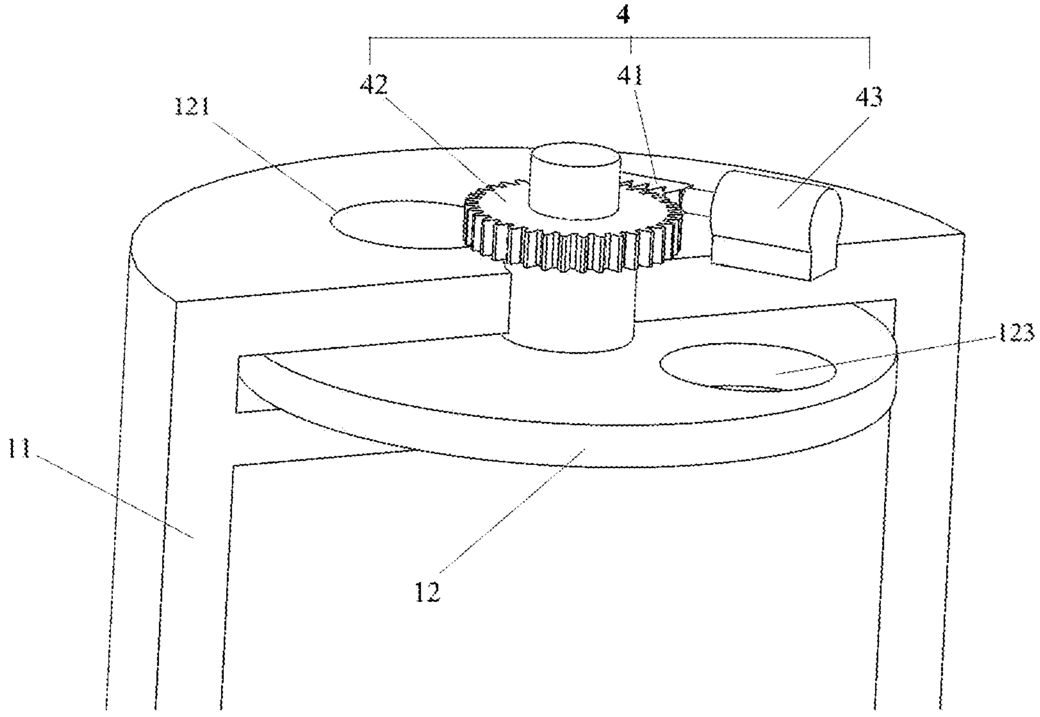
FIG. 3 is a schematic diagram of the structure of an intake valve drive mechanism.

As shown in FIG. 1 and FIG. 3, the cylinder 11 is provided with cylinder air inlets 121 and an intake valve 12 at the top. The intake valve 12 is in the form of a circular disc, and the intake valve is also provided with corresponding intake valve holes 123. The intake valve 12 opens or closes by means of rotating. When the intake valve 12 is rotated and its intake valve holes 123 are aligned with the cylinder air inlets 121 of the cylinder 11, the intake valve is opened; when the intake valve 12 is rotated and its intake valve holes are offset from the cylinder air inlets 121 of the cylinder 11, the intake valve is closed.

An intake valve drive mechanism 4 mounted on top of the cylinder 11 opens or closes the intake valve 12. In one embodiment, the intake valve drive mechanism 4 uses a hydraulic unit to drive a rack and pinion to open or close the intake valve 12. Specifically, the intake valve drive mechanism 4 comprises an intake valve rack 41, an intake valve gear 42, and a hydraulic unit 43. The intake valve gear 42 and the intake valve 12 are coaxially arranged and are fixedly connected by a central shaft sleeve, and the intake valve gear 42 and the intake valve 12 rotate together around a shaft. The intake valve rack 41 has a rod portion at one end, which is connected to the hydraulic unit 43, and a rack portion at the other end, which engages with the intake valve gear 42. The intake valve rack 41 drives the intake valve gear 42 to rotate, thereby rotating the intake valve 12 to open or close the intake valve 12.

Figure 4:
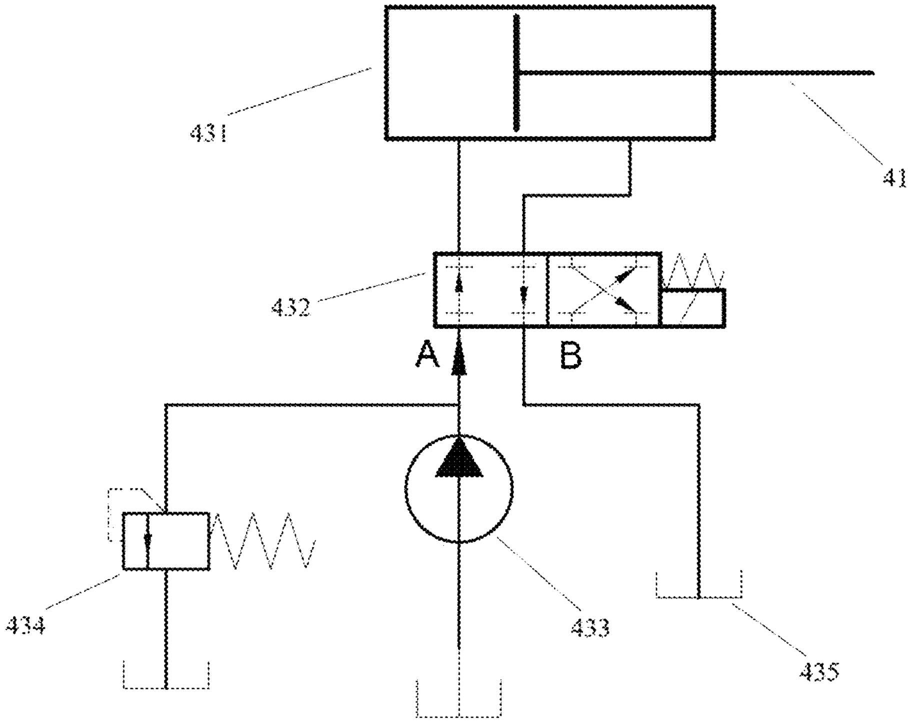
FIG. 4 is an illustration of the work principle of a hydraulic unit of the intake valve drive mechanism.

As shown in FIG. 4, the hydraulic unit 43 includes a hydraulic cylinder 431, a solenoid valve 432, a hydraulic pump 433, a pressure control valve 434, and a hydraulic oil tank 435. The hydraulic pump 433 provides power by pumping the hydraulic oil. In this embodiment, the solenoid valve 432 is a two-position two-way solenoid valve. The solenoid valve 432 receives an electrical signal to initially position the spool of the solenoid valve in position A, corresponding to the hydraulic oil outlet line of the hydraulic pump 433. The hydraulic oil is pumped into the left chamber of the hydraulic cylinder 431 via the corresponding pathway of the solenoid valve 432, pushing the intake valve rack 41 to extend and open the intake valve 12; or the electric signal shifts the spool of the solenoid valve 432 and positions the spool of the solenoid valve in position B corresponding to the outlet line of the hydraulic pump 433, so that the hydraulic oil is pumped into the right chamber of the hydraulic cylinder 431 and pushes the intake valve rack 41 to retract and closes the intake valve 12. The hydraulic oil in the left chamber of the hydraulic cylinder 431 is returned to the hydraulic oil tank 435 through the corresponding pathway of the solenoid valve 432. The pressure control valve 434 is provided to prevent the hydraulic system pressure from being too high, and when the hydraulic oil pressure exceeds the set value, the pathway of the pressure control valve 434 opens, and the hydraulic oil is returned to the hydraulic oil tank 435.

In one embodiment, the intake valve drive mechanism 4 uses an electric motor unit to drive the intake valve rack 41 and the intake valve gear 42 to open or close the intake valve 12.

As shown in FIGS. 5-8, the first exhaust valve 132 is in the form of a circular disc mounted in the valve slot 136 of the piston body 131 and is arranged coaxially with the piston body 131. The first exhaust valve 132 is provided with first exhaust valve holes 133, and the first exhaust valve 132 is rotatable within the valve slot 136 around an axis of the piston body 131. During rotating of the first exhaust valve 132, when the first exhaust valve holes 133 are aligned with the first vent holes 135 of the piston body 131, the first exhaust valve 132 opens, and combustion exhaust gases in the combustion chamber 111 above the piston 13 are expelled downwardly via the first vent holes 135 of the piston body 131, and the combustion chamber is in an exhaust stroke. When the first exhaust valve holes 133 are rotationally offset from the first vent holes 135, the first exhaust valve 132 is closed and the combustion chamber is in a closed state. Similarly, the second exhaust valve 142 is in the form of a circular disc mounted within the valve slot 146 of the displacer body 141 and is arranged coaxially with the displacer body 141. The second exhaust valve 142 is provided with second exhaust valve holes 143, and the second exhaust valve 142 is rotatable within the valve slot 146 around an axis of the displacer body 141. During rotating of the second exhaust valve 142, when its second exhaust valve holes 143 are aligned with the second vent holes 145 of the piston body 141, the second exhaust valve 142 opens, the combustion exhaust gas in the compression chamber 112 is expelled downwardly via the the second vent holes 145 of the displacer body 141, and the compression chamber is in an exhaust stroke. When the volume of the compression chamber 112 reaches its minimum value, the exhaust stroke of the compression chamber ends. Then the volume of the compression chamber 112 begins to expand, at this time, the first exhaust valve 132 is in a closed state, and then the outside air is drawn into the compression chamber 112 through the second exhaust valve 142 from below the cylinder 11. When the first exhaust valve 132 is open, the second exhaust valve 142 is closed and the compression chamber 112 receives the combustion exhaust from the combustion chamber 111.

The first exhaust valve 132 and the second exhaust valve 142 are controlled by a respective exhaust valve drive mechanism 5, utilizing high pressure gas within the compression chamber 112 as power to drive the first exhaust valve 132 and the second exhaust valve 142 to rotate. In one embodiment, the exhaust valve drive mechanism 5 comprises an exhaust valve rack 51, an exhaust valve gear 52 and a pneumatic device 53. For the piston 13, the gear 52 is coaxially mounted with the first exhaust valve 132 and is fixedly connected to the first exhaust valve 142 by means of a shaft sleeve. The rod portion of the rack 51 engaged with the gear 52 is connected to the pneumatic device 53. The pneumatic device 53 is then fixedly mounted on the corresponding position of the piston body 131. When the piston 13 moves to a pre-set position, a mechanical component of the engine triggers the pneumatic device 53, and the pneumatic device 53 drives the rack 51 to move, which in turn drives the gear 52 to rotate, thereby driving the first exhaust valve 132 to rotate to open or close the first exhaust valve 132. The second exhaust valve 142 is controlled in the same manner as the first exhaust valve 132.

Figure 6:
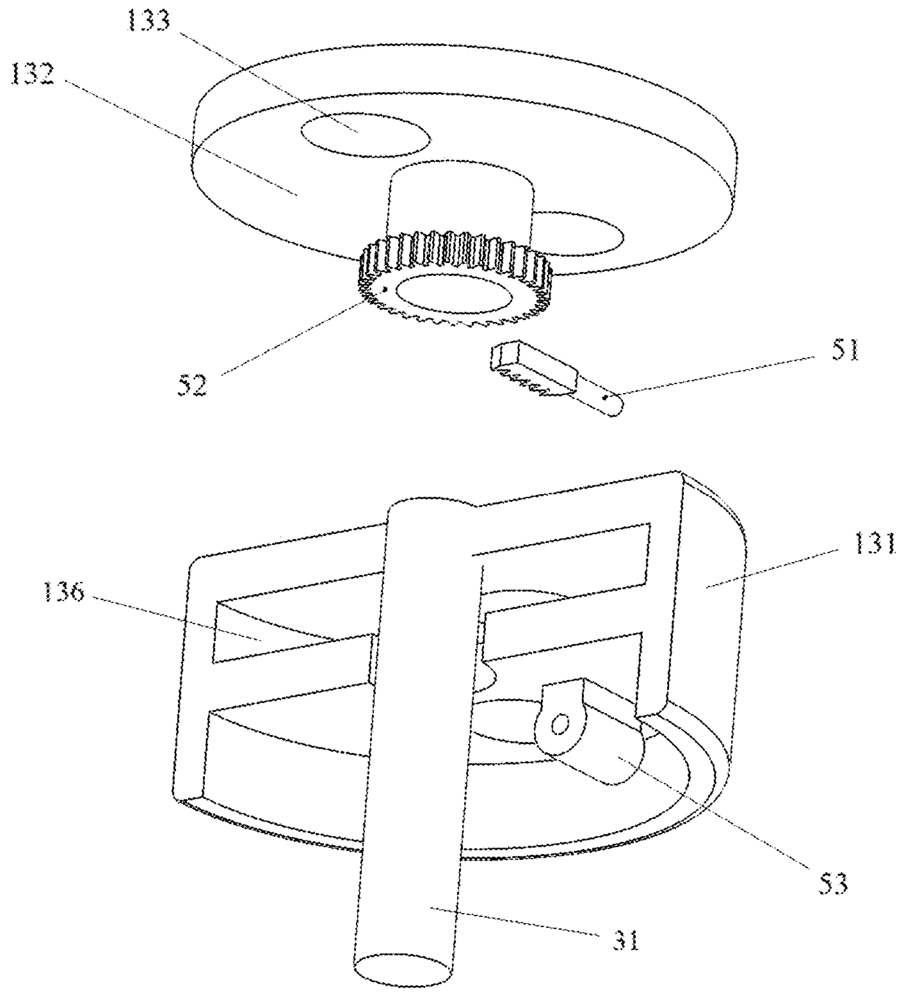
FIG. 6 is an exploded view of the structure of the piston.

Specifically, taking the first exhaust valve 132 of the piston 13 as an example, as shown in FIGS. 5, 6, the exhaust valve drive mechanism 5 includes the exhaust valve rack 51, the exhaust valve gear 52, and the pneumatic device 53. The exhaust valve gear 52 and the first exhaust valve 132 are coaxially and fixedly mounted on a sleeve 54, which is rotatably mounted in the piston body 131 and rotatable around the piston rod 13. The exhaust valve rack 51 has a rack portion at one end and a rod portion at the other end; the pneumatic device 53 is fixedly connected to the rod portion of the exhaust valve rack 51, and the rack portion of the exhaust valve rack 51 engages with the exhaust valve gear 52. The pneumatic device 53 uses the high-pressure working gas in the compression chamber 112 to drive the exhaust valve rack 51 to act, which in turn drives the first exhaust valve 132 to rotate, thereby opening and closing the airflow passage of the piston 13.

The working process of the pneumatic device 53 is described in detail below. As shown in FIG. 5, the pneumatic device 53 includes an gas reservoir 531, a directional valve 532, and an actuator cylinder 533, wherein the gas reservoir 531, the directional valve 532, and the actuator cylinder 533 are existing mature implementable industrial technologies. The gas reservoir 531 is filled with high pressure gas from the compression chamber 112 via an inlet port D of a check valve 534. In this embodiment, the directional valve 532 is a two-position two-way directional valve externally triggered by an engine mechanical component, and is initially located in position A. That is, the outlet port of the gas reservoir 531 corresponds to position A of the directional valve 532. When the external mechanical component triggers/pushes the directional valve 532, the spring of the directional valve 532 compresses, and the directional valve 532 moves to the position B. That is, the outlet port of the gas reservoir 531 corresponds to the position B of the directional valve 532.

Figure 7:
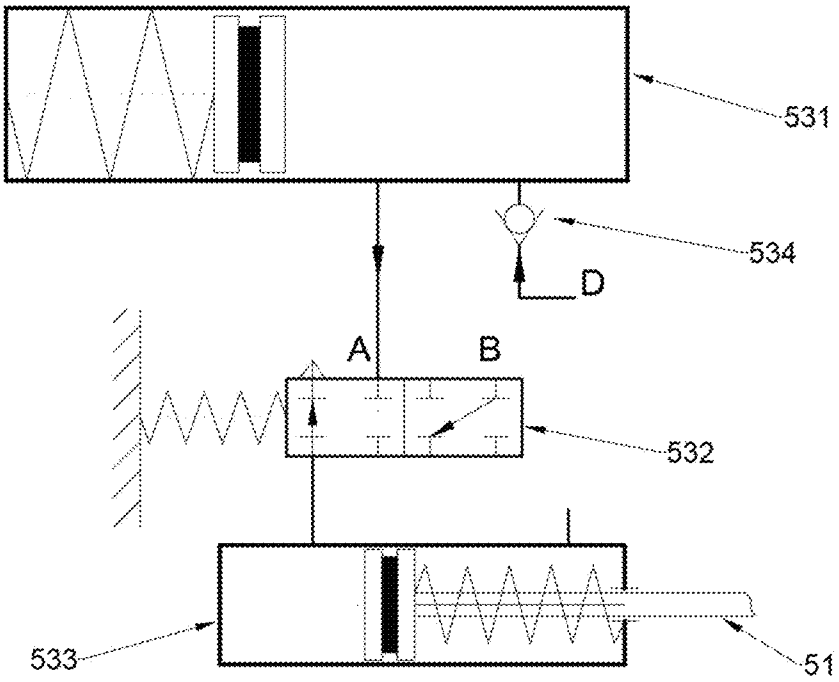
FIG. 7 is an illustration of the work principle of a pneumatic device.

Now the detailed working process of the pneumatic device of the piston 13 is illustrated as an example (FIG. 7). The first exhaust valve 132 of the piston 13 is in a initially closed state, at this time, the spring in the actuator cylinder 533 pushes the exhaust valve rack 51 toward the left cylinder chamber, and the rod of the exhaust valve rack 51 retracts into the actuator cylinder 533. When the starting motor drives the piston 13 to move, the gas in the compression chamber 112 will be compressed due to the fact that the first exhaust valve 132 and the second exhaust valve 142 are in closed state. For the compression chamber 112, the high pressure air is charged into the gas reservoir 531 via the check valve 534, at this time the directional valve 532 is in the position A. When the piston 13 moves to the BDC, the first exhaust valve 132 is set (triggered) to open. At this time, the directional valve 532 is triggered by an external mechanical component, which will push the directional valve 532 to move to the left side, and the spring of the directional valve 532 is compressed, and then the directional valve is in the position B. That is, the outlet of the gas reservoir 531 corresponds to the position B of the directional valve 532. At this time, the high-pressure gas in the gas reservoir 531 will enter the left chamber of the actuator cylinder 533 via the pathway of the directional valve 532, pushing the piston of the actuator cylinder 533 to move to the right side, and then drives the exhaust valve rack 51 to extend, which in turn drives the exhaust valve gear 52 and the first exhaust valve 132 that is coaxially connected to the exhaust valve gear 52 to rotate, thereby opening the first exhaust valve 132. The combustion chamber begins its exhaust stroke. Specifically, the directional valve 532 is used as the trigger point of the pneumatic device 533, pushing the directional valve 532 to move or the spring to reset elastically by means of outside mechanical components, and utilizing the high-pressure gas power in the air reservoir 531 to open or close the first exhaust valve 132. When the piston 13 moves upward to the TDC, the exhaust stroke of the combustion chamber 111 is completed, the directional valve 532 is triggered by the outside mechanical component, and the spring expands to push the directional valve 532 to the position A, that is, the outlet of the gas reservoir 531 corresponds to the position A of the directional valve 532. At this time, the compressed spring of the actuator cylinder 533 restores, pushing the piston of the actuator cylinder 533 to move to the left, and the gas in the left chamber of the actuator cylinder is expelled via the corresponding pathway of the directional valve 532. The exhaust valve rack 51 retracts, closing the first exhaust valve 132.

As shown in FIG. 2, the rhombic drive mechanism 3 includes a piston rod 31, a displacer rod 32, a pair of connecting rods 33, a pair of push rods 34, and a crank pair 36, and two transmission gears 35. The lower ends of the pair of connecting rods 33 are rotatably connected to the piston rod 31; the upper ends of the pair of push rods 34 is rotatably connected to the displacer rod 32; and the upper ends of the pair of connecting rods 33 and the lower ends of the pair of push rods 34 are connected to crank pins 361 of one crank pair 36 respectively. That is, the pair of connecting rods 33, the pair of push rods 34, the piston rod 31, and the displacer rod 32 are connected to each other to form a six-sided polygon drive mechanism. A pair of transmission gears 35 are mounted at the front ends of the two crankshafts 201 and 202, respectively and mesh with each other. The synchronized rotation of the double gears can constrain the rotation of the double crankshafts to be synchronized, which in turn constrains the piston rod 31 and the displacer rod 32 to move vertically in the axis direction of the cylinder to avoid mutual interference.

The displacer rod 32 is a tubular (hollow) rod extending in a vertical direction and is connected to the displacer 14 at the top end, and the bottom end extends towards the bottom end of the cylinder 11 and to the outside of the bottom end of the cylinder 11. The bottom end of the displacer rod 32 is in an inverted “T” shape and has a second cross beam 321 extending in the X-axis direction, the second cross beam 321 has a shaft hole (also referred to as a first shaft hole) at each end.

The piston rod 31 extends in a vertical direction and is connected to the piston 13 at the top end, and its bottom end passes through the center hole of the displacer 14 and the displacer rod 32 and extends beyond the bottom end of the displacer rod 32, i.e., the bottom end of the piston rod 31 is also located outside of the cylinder 11 and extends beyond the bottom end of the displacer rod 32. The bottom end of the piston rod 31 is in an inverted “T” shape and has a first cross beam 311 extending in the X-axis direction, the first cross beam 311 has a shaft hole (also referred to as a first shaft hole) at each end. The displacer rod 32 and the displacer 14 synchronously move linearly in the vertical direction, while the piston rod 31 and the piston 13 synchronously move linearly in the vertical direction, and the displacer rod 32 is sleeved on the piston rod 31, thus movements of the two do not interfere.

The push rod 34 is provided with two shaft holes (also referred to as second shaft holes), one at each end of the rod.

The shaft holes at the top end of the pair of push rods 34 are connected to the shaft holes at both ends of the second cross beam 321 of the displacer rod 32 respectively by pins, and the shaft holes at the bottom end are connected to the two crank pins 361 of one crank pair 36, respectively. The connecting rod 33 is provided with two shaft holes (also referred to as second shaft holes), one at each end, and the shaft holes at the bottom end of the pair of connecting rods 33 are connected to the shaft holes at the two ends of the first cross beam 311 of the piston rods 31 by pins, and the shaft holes at the top end are also connected to the two crank pins 361 of the one crank pair 36, respectively.

The piston 13 and the displacer 14 drive the double crankshafts through the rhombic drive mechanism 3 to output power. The movement of the piston 13 and the displacer 14, as well as the corresponding changes in the volume of the combustion chamber 111 and the compression chamber 112, are constrained by the rhombic drive mechanism 3: different angular positions of the crankshaft correspond to different volumes of the combustion chamber 111 and the compression chamber 112, as well as different operating states of the combustion chamber 111 and the compression chamber 112.

Since the lateral forces generated by the pair of connecting rods 33 and the pair of push rods 34 are canceled each other, there is no lateral pressure of the piston 13 and the displacer 14 on the inner wall of the cylinder, and the friction of the piston 13 and the displacer on the cylinder is reduced as the piston and the displacer move inside the cylinder. The double crankshafts share half of the power of the displacer 14 and the piston 13. Thus the strength requirements of the crankshaft are greatly reduced, the design of the crankshaft is simplified, the use of counterweight blocks is reduced, and the strength requirements of the crankshaft and crankcase are reduced.

The following describes the operation of this engine:

Preferably, the double crankshaft reciprocating engine uses crude oil as fuel, and in an operating cycle, in the combustion chamber 111 of the cylinder assembly, when the first exhaust valve 132 is closed, in the first stroke, the intake valve drive mechanism 4 opens the intake valve 12, and the piston 13 travels downwardly. The outside air enters into the combustion chamber 111 through the cylinder air inlets 121. In the second stroke, the intake valve drive mechanism 4 closes the intake valve 12, and the piston 13 moves upward, compressing the air in the combustion chamber 11. The air is compressed and warms up to reach and exceed the ignition point of the crude oil fuel. In the third stroke, the engine's fuel injection system injects atomized crude oil into the combustion chamber 111, and the crude oil forms a mixed combustible gas with the air in the combustion chamber 111. The combustible gas mixture burns and expands, driving the piston 13 downwardly. The piston 13 drives the push rods and double crankshaft to move, and the power is obtained. In the fourth stroke, the rhombic transmission mechanism 202 drives the piston 13 to move upwardly, at this time the first exhaust valve 132 rotates so that the first exhaust valve hole 133 aligns with the first vent hole 135. The first exhaust valve 132 opens, and the exhaust gas in the combustion chamber 111 is expelled into the compression chamber 112 through the first vent hole 135 of the piston 13.

In a working cycle, articulating the above work process of the combustion chamber 111, subsequently in the compression chamber, after the exhaust gas of the fuel combustion in the combustion chamber 111 is discharged into the compression chamber 112, it undergoes four strokes in the compression chamber. In the first stroke, i.e., the Intake stroke, that is, the volume of the compression chamber 112 reaches a very small value, corresponding to the position of the crank angle of the crankshaft 201 of 180°, and the compression chamber begins its intake stroke. At this time, the second exhaust valve 142 is still in the open state and the first exhaust valve 132 is still in the closed state (at this time, the combustion chamber 111 is still in the power stroke of another work cycle), the air will be drawn in from the cylinder 11 below with the volume expansion of compression chamber 112. When the first exhaust valve 132 is opened, the combustion exhaust gas in the combustion chamber 111 is expelled into the compression chamber 112, the valve drive mechanism 5 of the displacer 14 is triggered to close the second exhaust valve 142, and the compression chamber 112 receives the exhaust gas from the combustion chamber 111. In these two processes, the piston 13 and the displacer 14 are driven away from each other by the rhombic drive mechanism 3, and the volume of the compression chamber continues to increase for the intake stroke. In the second stroke, the rhombic drive mechanism 3 drives the displacer 14 and the piston 13 to move towards each other, and the volume of the compression chamber 112 decreases. The exhaust gas in the compression chamber 112 is compressed, firstly as a compressed gas, it store energy, which can reduce the impact of engine operation, and reduce noises; secondly, the residual heat of the exhaust gas in the combustion chamber can heat the outside air drawn into the compression chamber 112 in the first stroke, that is, the residual heat of the exhaust gas is used to do work; thirdly, in some conditions in the combustion chamber 111, the crude oil can't burn completely and the residual fuel may enter the compression chamber 112 and continue burning. This would make full use of the fuel combustion and improve emissions. In the third stroke, the volume of the compression chamber 112 increases, the gas expands to do work and the stored energy is released. At this time, the increased pressure of the exhaust gas in the compression chamber 112 forces the piston 13 and displacer 14 to move relatively in opposite directions, and then through the rhombic drive mechanism 3 to drive the two crankshafts to rotate. to do work externally. In the fourth stroke, the piston 13 and the displacer 14 are driven by the rhombic drive mechanism 3 to move towards each other, the volume of the compression chamber 112 decreases, and the second exhaust valve 142 is opened to expel the exhaust gas in the compression chamber out of the cylinder 11. At this time, the piston 13 and the displacer 14 are driven by the rhombic transmission mechanism close to each other, and when the volume of the compression chamber 112 decreases to its minimum, the exhaust gas in the compression chamber is expelled out of the cylinder through the second exhaust valve 142. Thereafter, the second exhaust valve 142 remains open to draw some outside air from below the cylinder into the compression chamber 112. Until the second exhaust valve 142 is closed, it enters the stage where the compression chamber 112 draws in the exhaust gases from the combustion chamber 111.

When using diesel fuel, the double crankshaft reciprocating engine operates in the same way as the crude oil fuel described above.

Due to the existence of the compression chamber 112, the exhaust gas is expelled from the combustion chamber 111 into the compression chamber 112, and cold outside air can be drawn into the compression chamber to utilize the residual heat of the high-temperature exhaust gas to expand, and the exhaust gas may be further compressed for combustion to do further work and to improve the exhaust gas emissions. The existence of compression chamber extends the fuel combustion from one stroke to two strokes, which can effectively burn the refractory components of the crude oil, not only reducing the crude oil fuel requirements, but also greatly simplifying the design of the combustion chamber 111 of the crude oil engine. When the combustion chamber 111 is in the best combustion condition, the compression chamber 112 compresses the exhaust gas to store mechanical energy, and can realize the use of exhaust gas waste heat to do work. When the combustion chamber 111 is in some hard working conditions such as operating at high speed, the compression chamber 112 can further compress the exhaust gas for combustion. The speed and power output of the crude oil engine can be improved, and the exhaust gas emission is also improved.

The beneficial effects of the present invention are analyzed as follows:

The engine of the present invention will have the following advantages over the prior art:

a. Due to the symmetry of the double crankshaft, the lateral inertia forces are canceled, and the double crankshaft shares half of the power of the piston and the displacer. Therefore, the design of the crankshaft is greatly simplified and the use of counterweight blocks is reduced. The double crankshaft disperses the force on the crankcase and reduces the strength requirements of the crankshaft and crankcase.

b. Due to having one compression chamber, the impact of the engine is greatly reduced, and the vibration and noise of the engine are reduced. The energy storage or work done in the compression chamber makes the working cycle of the engine more even and smooth.

c. Since the compression chamber can be used as a gas energy storage and part of the incomplete combustion conditions continue to be compressed and warmed up to combust and expand, the working conditions adapted to the reciprocating engine are greatly broadened, improving the maximum power.

Preferred embodiments of the present invention have been described in detail above, but it should be understood that aspects of the embodiments can be modified to employ aspects, features and ideas from various patents, applications and publications to provide additional embodiments, if desired.

These and other variations to the embodiments can be made in view of the detailed description above. Generally, in the claims, the terms used should not be considered as limiting the specific embodiments disclosed in the specification and claims, but should be understood to include all possible embodiments together with the full scope of equivalents enjoyed by those claims.

Those of ordinary skill in the art can understand that the above embodiments are specific embodiments for realizing the present invention, while in practical application, various changes can be made thereto in form and details without deviating from the spirit and scope of the present invention.

The invention claimed is:

1. A double crankshaft reciprocating engine, comprising:

a plurality of cylinder assemblies, each cylinder assembly comprising:

a cylinder, which is provided with cylinder air inlets and an intake valve at the top;

a piston, which is mounted in the cylinder, the piston and an inner wall of the cylinder located above the piston form a combustion chamber; the piston is provided with first vent holes and a first exhaust valve for controlling the on-off of the first vent holes; and a displacer, which is mounted in the cylinder and located below the piston, a cylindrical space between the displacer and the piston is a compression chamber; the displacer is provided with second vent holes and a second exhaust valve for controlling the on-off of the second vent holes; and a double crankshaft transmission system, comprising:

two crankshafts provided in parallel, each crankshaft comprises a plurality of cranks, a plurality of the corresponding cranks of the two crankshafts constitute a plurality of crank pairs, and each of the crank pairs is mirror symmetric with respect to a YZ plane;

a pair of transmission gears which are mounted on the front ends of the two crankshafts and mesh with each other;

wherein a midpoint of a connecting line of centers of the pair of transmission gears is defined as the origin O of an XYZ coordinate system, the connecting line of centers is defined as an X-axis direction, a direction parallel to the axis of the transmission gears is defined as a Y-axis direction, and a vertical direction is defined as a Z-axis direction, a plurality of displacer rods, each displacer rod is a hollow rod that extends in the Z-axis direction and is connected to the displacer at a top end and extends out of a bottom end of the cylinder at a bottom end;

a plurality of piston rods, each piston rod extends in the Z-axis direction and has a top end connected to the piston and a bottom end passing through the displacer and the displacer rod and extends beyond the bottom end of the displacer rod;

a plurality pairs of push rods, upper ends of each pair of the push rods are rotatably connected to the bottom end of the displacer rod respectively; and a plurality of pairs of connecting rods, lower ends of each pair of the connecting rods are rotatably connected to the bottom ends of the piston rods respectively, and the lower ends of each pair of the push rods and the upper ends of each pair of the connecting rods are rotatably connected to the same crank pair respectively, so that each pair of the connecting rods and each pair of the push rods form a rhombic structure.

2. A double crankshaft reciprocating engine according to claim 1, wherein the bottom ends of the displacer rod and the piston rod are in an inverted "T" shape, and respectively have a cross beam extending in the X-axis direction, the cross beam is provided with a first shaft hole at each end, each connecting rod and each push rod are provided with a second shaft hole at each end, the piston rod and the displacer rod are connected to the connecting rod and the push rod by means of pins which link the first shaft hole and the second shaft hole; and the piston rod and the displacer rod are pivotally connected to the connecting rod and the push rod by means of pins which link the first shaft hole and the second shaft hole.

3. A double crankshaft reciprocating engine according to claim 2, wherein each of the cranks is provided with a crank pin, and the connecting rods and the push rods are pivotally connected to the crank pair by means of the second shaft hole cooperating with the crank pins of the crank pair.

4. A double crankshafts reciprocating engine according to claim 1, wherein the first exhaust valve is rotatably mounted in the piston and provided with first exhaust valve holes, the first exhaust valve is connected to an exhaust valve drive mechanism mounted on the piston to realize the opening and closing of the first exhaust valve by means of rotating the first exhaust valve, when the first exhaust valve is closed, the first vent holes and the first exhaust valve holes are offset and not communicated, when the first exhaust valve is open, the first vent holes are aligned and communicated with the first exhaust valve holes, and the structural form and working principle of the second exhaust valve are the same as those of the first exhaust valve.

5. A double crankshaft reciprocating engine according to claim 4, wherein the exhaust valve drive mechanism comprises;

an exhaust valve rack, an exhaust valve gear, and a pneumatic device, wherein the exhaust valve gear and the first exhaust valve are coaxially and rotatably mounted on the piston, the exhaust valve rack engages with the exhaust valve gear at one end and is fixedly connected to the pneumatic device at the other end, and the pneumatic device is actuated by a high-pressure gas in the compression chamber.

6. A double crankshaft reciprocating engine according to claim 5, wherein the pneumatic device comprises:

a gas reservoir, a pressure control valve and an actuator cylinder, wherein an inlet of the gas reservoir is fluidly communicated with the compression chamber through a one-way intake valve, an outlet of the gas reservoir is fluidly communicated with the actuator cylinder through the pressure control valve, the pressure control valve is a pressure controlled two-position two-way valve, and a piston of the actuator cylinder is connected to the rod portion of the control rack.

7. A double crankshaft reciprocating engine according to claim 1, wherein the intake valve is rotatably mounted in the cylinder air inlets and provided with intake valve holes, the intake valve is connected to an intake valve drive mechanism mounted outside the top of the cylinder to realize the opening and closing of the intake valve by rotating the intake valve, when the intake valve is closed, the cylinder air inlets and the intake valve holes are offset and not communicated, and when the intake valve is open, the cylinder air inlets are aligned and communicated with the intake valve holes.

8. A double crankshaft reciprocating engine according to claim 7, wherein the intake valve drive mechanism comprises an intake valve rack, an intake valve gear and a hydraulic unit, wherein the intake valve gear and the intake valve are coaxially and rotatably mounted in the cylinder air inlets, and the intake valve rack engages with the intake valve gear at one end and is fixedly connected with the hydraulic unit at the other end.

* * * * *